United States Patent [19]
Nemoto

[11] Patent Number: 5,711,505
[45] Date of Patent: Jan. 27, 1998

[54] SLIDE RAIL DEVICE FOR JUMP SEAT

[75] Inventor: Akira Nemoto, Akishima, Japan

[73] Assignee: Tachi-S Co., Ltd., Tokyo, Japan

[21] Appl. No.: 722,989

[22] Filed: Sep. 30, 1996

[51] Int. Cl.⁶ .................... B60N 2/30; F16M 13/00
[52] U.S. Cl. ............ 248/424; 296/65.1; 297/331; 297/336
[58] Field of Search .................. 248/424, 419, 248/429; 297/331, 335, 336; 296/65.1

[56] References Cited

U.S. PATENT DOCUMENTS

| | | | |
|---|---|---|---|
| 4,606,577 | 8/1986 | Hirama et al. | 297/331 |
| 4,736,985 | 4/1988 | Fourrey et al. | 297/331 |
| 4,949,931 | 8/1990 | Fufiwara et al. | |
| 5,106,144 | 4/1992 | Hayakawa et al. | 296/65.1 X |
| 5,230,544 | 7/1993 | Morritt et al. | 297/336 X |
| 5,364,152 | 11/1994 | Mastrangelo et al. | 296/65.1 |
| 5,516,071 | 5/1996 | Miyauchi | 297/331 X |
| 5,524,721 | 6/1996 | Yamauchi | 296/65.1 X |
| 5,529,378 | 6/1996 | Chaban et al. | |
| 5,562,322 | 10/1996 | Christoffel | 297/336 X |
| 5,622,348 | 4/1997 | Stechly | 248/249 X |
| 5,626,391 | 5/1997 | Miller et al. | 297/331 |
| 5,634,686 | 6/1997 | Okazaki | 296/65.1 X |
| 5,641,146 | 6/1997 | Hoshihara et al. | 248/424 X |

FOREIGN PATENT DOCUMENTS

| | | |
|---|---|---|
| 56-163036 | 12/1981 | Japan . |
| 59-34938 | 2/1984 | Japan . |
| 59-34939 | 2/1984 | Japan . |
| 8-230530 | 9/1996 | Japan . |

Primary Examiner—Peter M. Cuomo
Assistant Examiner—Robert J. Sandy
Attorney, Agent, or Firm—Browdy and Neimark

[57] ABSTRACT

A slide rail device for use with a jump seat that can be jumped up and rotated to a storage area in an automobile, in which a locking mechanism is provided for locking and unlocking the jump seat with respect to an lower rail member fixed in the floor of automobile. The locking mechanism includes a female engagement member fixed at the jump seat, a lock member having a male engagement portion for engagement with that female engagement member, and an actuator arm operatively connected to the lock member. When the jump seat is unlocked from the slide rail device, the female engagement member is withdrawn in the lower rail member out of engagement with the female engagement member, so that there is no projection of male engagement portion of the locking mechanism from the lower rail member, which avoids undesired contact and damage between the locking mechanism and baggage or article loaded on the floor. The actuator arm may be contacted by the female engagement member, and pushed thereby to cause rotation of the lock member to again bring the male engagement portion into engagement with the female engagement member for locking the jump seat to the lower rail member.

17 Claims, 6 Drawing Sheets

SLIDE RAIL DEVICE FOR JUMP SEAT

BACKGROUND OF INVENTION

1. Field of the Invention

The present invention relates to a slide rail device for use with a so-called jump seat that can be jumped or rotated about a hinge to an inverted upright state, and particularly to the slide rail device for use with a rear seat of this jump-seat type that can be rotated forwardly to a storage area behind a front seat to widen a rearward floor area in a van- or wagon-type automobile.

2. Description of Prior Art

In some of such van or wagon types of automobiles, there is employed a jump seat construction for a rear seat, including second and third rear seats, which permits the seat cushion thereof to be jumped or rotated about a hinge bracket towards a front seat, so as to widen the rearward floor area of the automobile for use as a load-carrying area or for other purposes. Hereinafter, this sort of rear seat shall be referred to as a "jump rear seat".

Further, it has been known that such jump rear seat is provided with a slide rail device by which the seat may be slidably adjusted in position in the fore-and-aft direction on the rearward floor area of automobile. As can be seen from FIGS. 1 and 2 for instance, in general, the slide rail device of this kind has an elongated or long lower rail member which is embedded or fixed in a recessed groove of floor of automobile so that the lower rail member is located below the surface of floor, not projecting upwards therefrom, in consideration of safe and outer aesthetic appearance inside the rearward area of automobile.

The conventional slide rail device for this jump rear seat includes a locking element for locking and unlocking the body of seat with respect to the floor, which is typically composed of a female lock member, e.g. a U-shaped member (or the so-called striker), provided at a seat cushion of the jump rear seat, and a male lock member, e.g. a hook-like lock member, provided at a predetermined area of a long lower rail member fixed in the floor of automobile. Thus, engagement and disengagement of the male lock member with and from the female one will place the seat in either of a locked and unlocked states with regard to the floor. However, this conventional design of lock element has been defective in that the male lock member projects upwardly from the lower rail member to permit its engagement with the female lock member of upper rail member, as a result of which, when the seat is rotated to a non-use inverted position, such upward projection of male lock member will keenly contact or damage a baggage or an article which is loaded on the widened area of floor made available by such jumping of rear seat. Also, the projection of male lock member impairs the aesthetic appearance of floor and interior of automobile.

SUMMARY OF THE INVENTION

In view of the above-stated drawbacks, it is therefore a primary purpose of the present invention to provide an improved slide rail device for jump seat which avoids undesired projection of a male lock portion of locking mechanism from an upper rail member.

In order to achieve such purpose, a slide rail device for jump seat in accordance with the present invention is basically comprised of:

a lower rail means fixed in a floor of an automobile;

an upper rail means slidably fitted in the lower rail means, on which upper rail member, a seat cushion of jump seat is pivotally mounted at one end portion thereof, wherein the jump seat may be adjusted in position, via those upper and lower rail means, in a fore-and-aft direction of the automobile; and a locking mechanism for locking and unlocking the jump seat to and from the upper rail means, which locking mechanism includes:

a female engagement means provided at another end portion of the seat cushion of jump seat;

a lock means having a male engagement portion, the lock means being so rotatable within the lower rail means as to project and withdraw said male engagement portion from and into the lower rail means;

an actuator means which is so operatively connected with the lock means within the lower rail means that the actuator means normally retains the lock means at an unlocked position where the male engagement portion of lock means is withdrawn in the lower rail means and disengaged from the female engagement means and, further the actuator means, when pushed by the female engagement means, causes the lock means to rotate towards a locked position where the male engagement portion of lock means projects from the upper rail means and engages the female engagement means; and a lever means movably provided at the upper rail means, the lever means being operatively engaged with the lock means, wherein operation of the lever means permits the lock means to be rotated towards one of the unlocked and locked positions.

Accordingly, when the jump seat is jumped up and rotated from the slide rail device to an inverted upstanding state at an storage area in an automobile, the male engagement portion of lock means does not project from the upper rail means, thereby avoiding the above-stated problems found in the prior art.

Preferably, the locking means may comprise a rotary lock member pivotally mounted at the upper rail means within said lower rail means. The male engagement portion may be formed in one side of this rotary lock member, while a connecting area is formed at another side of the rotary lock member, in which connecting area, the actuator means is operatively connected. The actuator means may comprise an actuator arm and a biasing spring, such that the actuator arm is rotatably mounted at the upper rail means and so disposed within the lower rail means as to be not only operatively connected with the rotary lock member, but also be accessible by the female engagement means, whereby the actuator arm, when pushed by the female engagement means, causes the rotary lock member to rotate towards the locked position, while being urged by the biasing means towards a direction to retain the rotary lock member at the unlocked position.

In one aspect of this invention, the rotary lock member has a center of rotation defined between said male engagement portion and connecting area thereof, and the actuator means comprises a generally inverted-U-shaped actuator arm member rotatably mounted at the upper rail means, such that the actuator arm member has a connecting end portion which is extended in a direction opposite to a direction in which the male engagement portion extends from the rotary lock member, and connected to the connecting area of rotary lock member, and further has an upper edge on which said female engagement means is to be contacted so that the connecting area of this actuator member may be displaced to cause simultaneous rotation of the rotary lock member about the center of rotation.

It is a second purpose of the present invention to provide an aesthetically improved appearance of the slide rail device in a floor area of automobile when the jump seat is set in an inverted upstanding state at the storage area in the automobile.

For that purpose, the lower rail means may be fixedly embedded in the floor such that an upper side of said lower rail means is only exposed from the floor, and the upper rail means may be formed with an upper horizontal section and a vertical slide section integrally extending downwardly from the upper horizontal section, with the vertical slide section being slidably fitted in and along the lower rail means. The lock and actuator means of locking mechanism may be disposed at that vertical slide section of upper rail means, and the lever means be disposed at the upper horizontal section of upper rail means. A cover member may be affixed on an upper surfaces of the upper horizontal section of upper rail means to enhance a smooth and aesthetic appearance of the upper rail means on the floor of automobile.

Other features and advantages of the present invention will become apparent from reading of the descriptions hereinafter, with reference to the appended drawings.

DETAILED DESCRIPTION OF PREFERRED EMBODIMENT OF THE INVENTION

Referring to FIGS. 1 through 13, there is illustrated one preferred embodiment of slide rail device for use with a jump seat or jump rear seat in accordance with the present invention.

Figure 1:
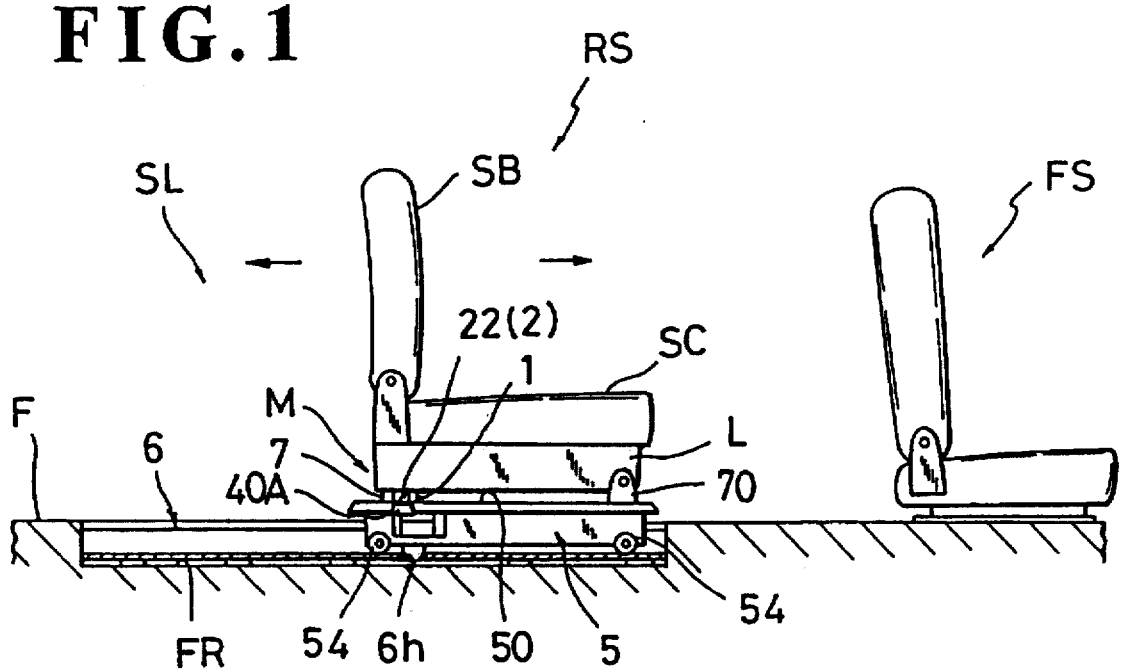
FIG. 1 is a schematic diagram of a slide rail device for jump seat, which shows a locked state of the jump seat.
Figure 2:
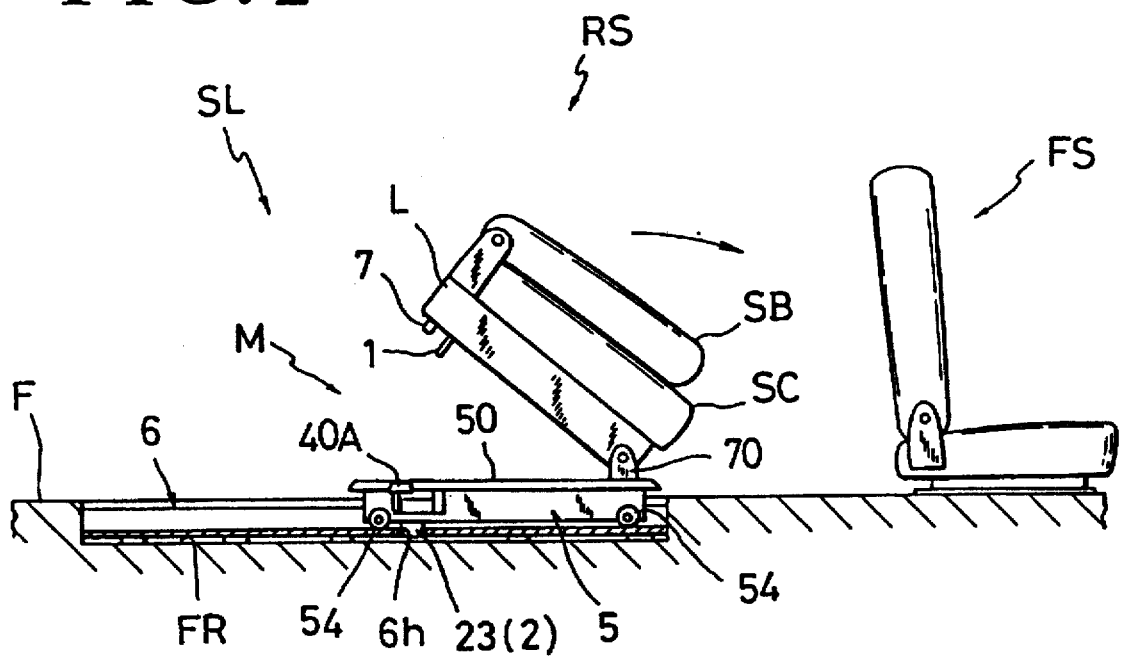
FIG. 2 is a schematic diagram of the slide rail device, which shows an unlocked state of the jump seat.
Figure 12:
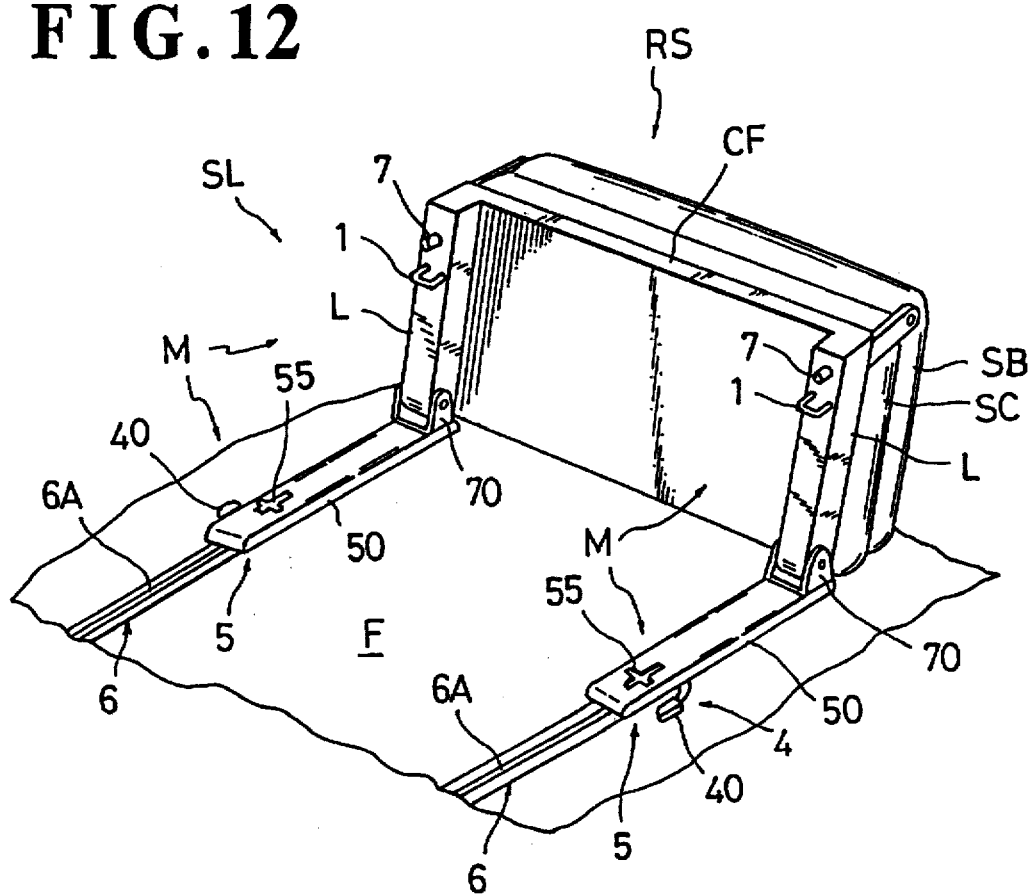
FIG. 12 is a partly broken schematic perspective view showing a whole slide rail device for jump seat, which shows the jump seat to be unlocked and set at a storage area.

FIGS. 1, 2 and 12 show a general construction of a jump rear seat (RS) and a pair of spaced-apart slide rail devices (SL)(SL) provided therewith.

As with a van or wagon car, the jump rear seat (RS) is slidably provided in a rearward area behind a front seat (FS) and adjustable in position via the slide rail devices (SL) in the fore-and-aft direction of automobile body. The jump rear seat (RS) is rotatable about two hinge brackets (70)(70) vertically either towards an ordinary use position shown in FIG. 1 or towards a non-use inverted position shown in FIGS. 2 and 12, so that a rearward area of floor (F) may be widened for loading purpose or other various uses. The illustrated two slide rail devices (SL) are each of a so-called long slide rail type used in a wide rearward area of vehicle, including a basic slide rail assembly formed by elongated lower rail member (6) fixed in the floor (F) and a movable upper rail member (5) slidably fitted in that lower rail member (6). The jump rear seat (RS) is mounted via the two hinge brackets (70)(70) upon the two slide rail devices (SL)(SL).

Each slide rail device (SL) in accordance with the present invention is comprised of: an upper rail member (5), an elongated lower rail member (6) and a locking mechanism (M).

Figure 5:
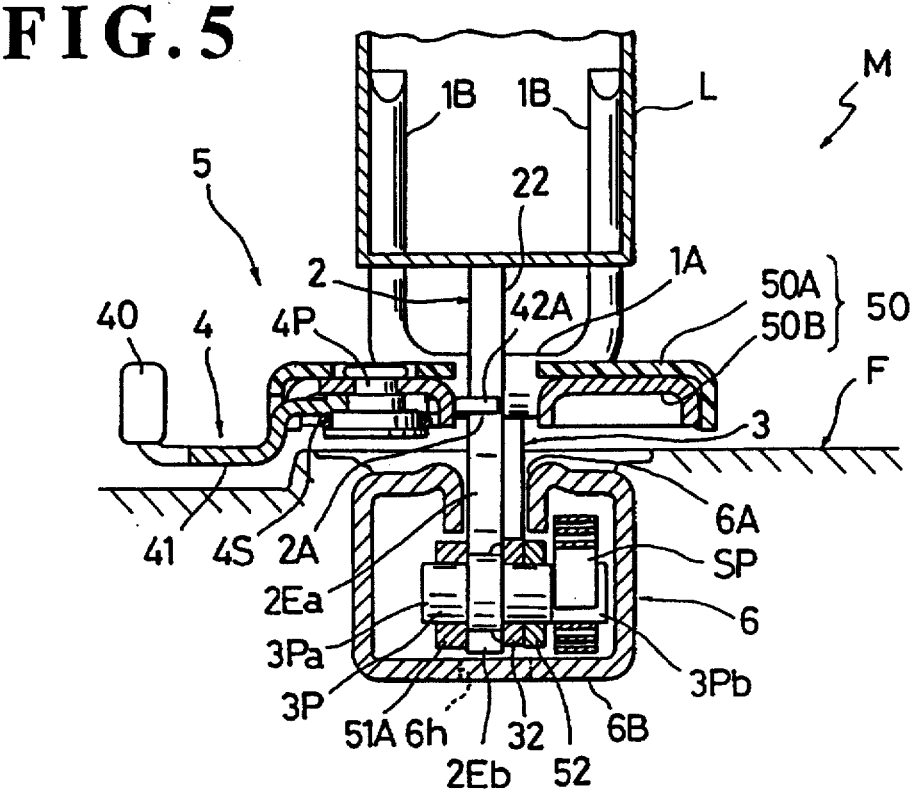
FIG. 5 is a sectional view taken along the line V—V in FIG. 3.
Figure 6:
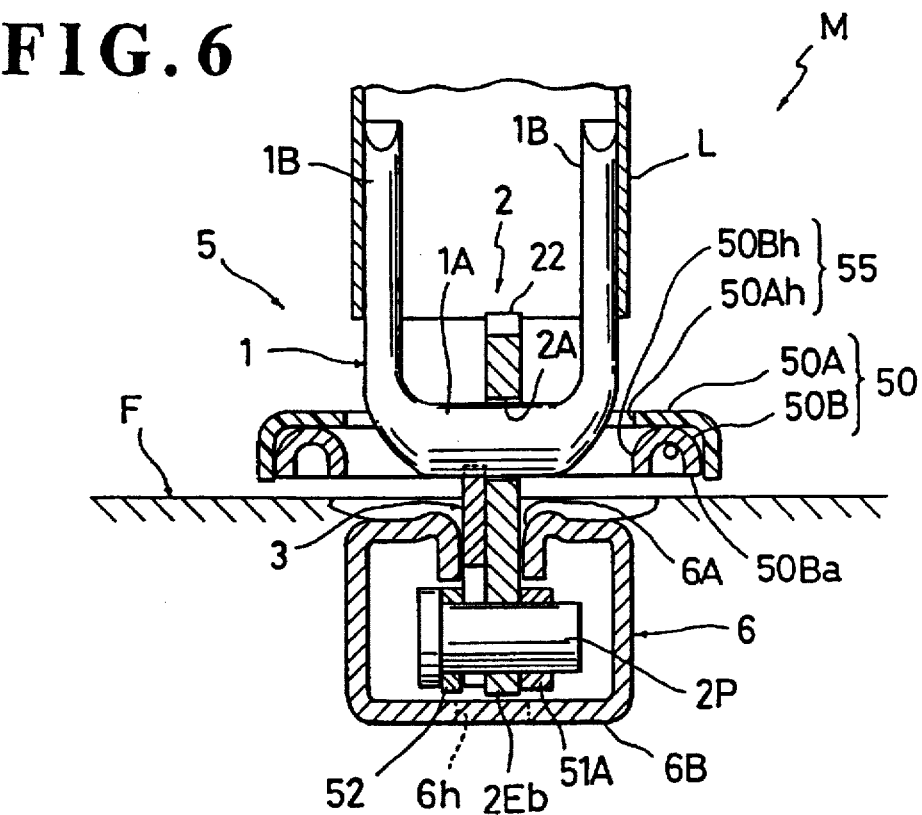
FIG. 6 is a sectional view taken along the line VI—VI in FIG. 3.

The upper rail member (5) is of a generally "T" shape in cross-section, consisting essentially of an upper horizontal section (50) and a vertical slide section (51). The upper horizontal section (50) is best shown in FIGS. 5 and 6 to comprise a rigid main horizontal portion (50B) forming one integral part of this upper rail member (5), and a cover member (50A). Cover member (50A) is affixed on the whole upper surfaces of that main horizontal portion (50B) to give a smooth touch and aesthetically improved appearance to the upper rail member (5). Preferably, the cover member (50A) may be formed from a suitable rigid synthetic resin material. The vertical slide section (51), made of a rigid plate material, extends downwardly and integrally from the main horizontal portion (50B) of upper horizontal section (50), as can be seen from FIGS. 3, 4 10 and 11.

The lower rail member (6) is formed to generally have a channel cross-section, with a guide slit (6A) opened in and along the central longitudinal axis thereof, and is so embedded in the floor (F) that its upper side and guide slit (6A) are only exposed from and below the upper surface of floor (F).

As known in the art, the upper rail member (5) is slidably engaged in the lower rail member (6), with the vertical slide section (51) of the former (5) being slidably fitted in and along the guide slit (6A) of the latter (6), and a plurality of rollers (54) are provided at that vertical slide section (51) to support the upper rail member (5) movably within the lower rail member (6), with the lower edge of the vertical slide section (51) spaced from the bottom wall (6B) of lower rail member (6).

The jump rear seat (RS) has a leg portion (L) defined in a seat cushion frame (CF) upon which its seat cushion (SC) is mounted, the leg portion (L) being at a forward end area thereof connected rotatably to a hinge bracket (70) fixed on one end area of the foregoing horizontal upper section (50) of upper rail member (5).

In accordance with the present invention, the slide rail device (SL) is of such a locking arrangement that a locking mechanism (M) is disposed between the slide rail assembly (5, 6) and jump rear seat (RS), and that an opening (55) is formed in the horizontal plate section (50) of upper rail member (5). As shown in FIG. 12, a pair of such locking mechanisms (M)(M) are provided, but a description will be made of only one locking mechanism (M) for the sake of simplicity.

The locking mechanism (M) is arranged at a backward end area of both jump rear seat (RS) and slide rail assembly (5, 6), as shown, and basically comprises: a generally U-shaped female engagement member (1) (a so-called striker); a rotary lock member (2) having a hook-like first male engagement end portion (22) to be engaged with the female engagement member (1); an actuator arm (3); and an operation lever (4).

The female engagement member (1) is dependent from the leg portion (L) of seat cushion (SC) associated with the jump rear seat (RS), having a pair of vertical base portions (1B)(1B) welded to the inner walls of that leg portion (L) and a horizontal engagement portion (1A) projected from the leg portion (L).

Figure 7:
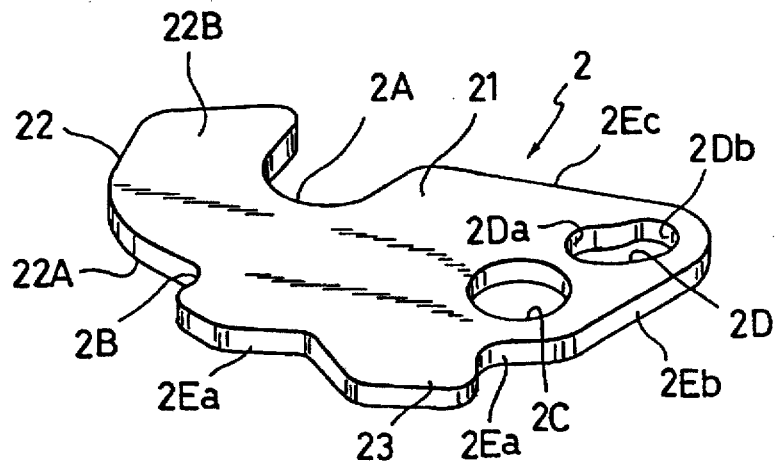
FIG. 7 is a perspective view of a rotary lock member provided in the slide rail device.

The rotary lock member (2) is pivotally mounted via a pin (2P) to the vertical slide section (51) of upper rail member (5). As best shown in FIG. 7, the rotary lock member (2) is basically formed from a rigid plate material such as to have a main body portion (21), a hook-like first male engagement portion (22) and a second male engagement portion (23), with a bearing hole (2C) and an arcuate guide hole (2D) defined in the main body portion (21). The bearing hole (2C) forms a center of rotation of this lock member (2), about which bearing hole, the first and second male engagement portions (22)(23) may be rotatively displaced for their respective locking/unlocking purposes to be described later. More specifically, the illustrated rotary lock member (2) is configured in a generally square shape, excepting the first and second engagement portions (22) (23), such that the main body portion (21) has a first base edge part (2Ea), a second base edge part (2Eb) and a free edge part (2Ec), and that the bearing hole (2C) is defined adjacent to a corner area between the first and second base edge parts (2Ea)(2Eb), while the arcuate guide hole (2D) is defined adjacent to another corner area between the second base and free edge parts (2Eb)(2Ec). The guide hole (2D) has a first edge (2Da) and a second edge (2Db) which will provide a limit against rotation of the actuator arm (3) as will be explained later. The first male engagement portion (22) projects integrally from an edge side of this main body portion (21) opposite to the second base edge part (2Eb), with a lock notch (2B) defined at the root of that particular engagement portion (22). Designation (2A) denotes a curved engagement portion of such hook-like male engagement portion (22) into which the horizontal section (1A) of female engagement member (1) is to be received. The second male engagement portion (23) projects integrally from the first base edge part (2Ea). In summary, a preferred general design of this rotary lock member (2) is such that both first and second male engagement portions (22)(23) are defined at a point opposed to the arcuate guide hole (2D) in relation to the bearing hole (2C), so that the arcuate guide hole (2D) may be used as a point of action for the actuation arm (3) to cause rotative displacement of those two engagement portions (22)(23) about the central axis of gearing hole (2C), as will be explained later.

Figure 10:
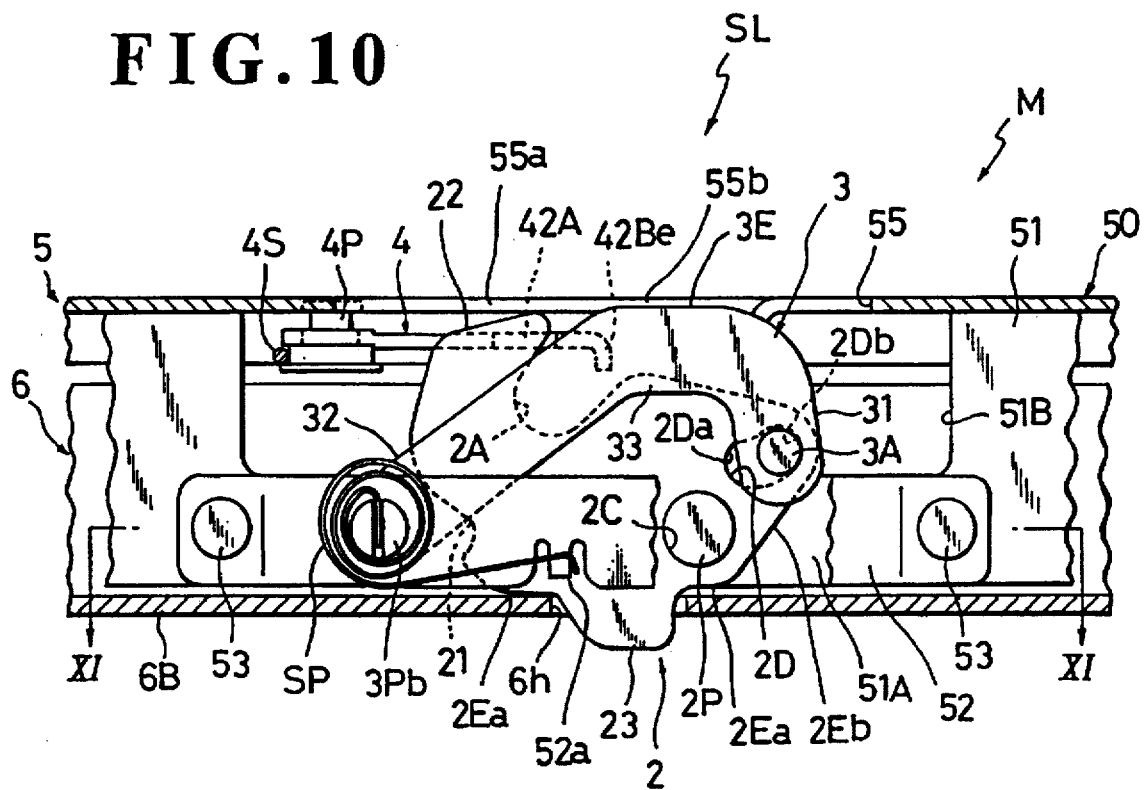
FIG. 10 is a partly broken sectional view of the locking mechanism provided in a lower rail member, showing the unlocked state thereof.
Figure 11:
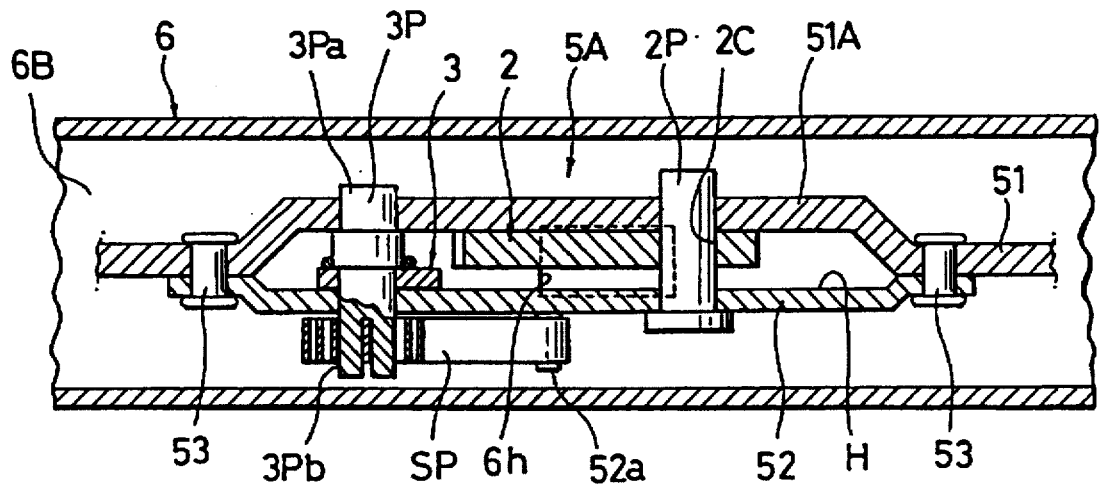
FIG. 11 is a sectional view taken along the line XI—XI in FIG. 10.

It can be observed from FIG. 10 that the above-described rotary lock member (2) is accommodated bodily within the slide rail assembly, and otherwise stated, it is disposed between the upper and lower rail members (5)(6), with most body thereof being mounted within the lower rail member (6) via the vertical slide section (51) of upper rail member (5), except that the first male engagement portion (22) projects partway from the lower rail member (6) to a level approximate to the opening (55) formed in the upper horizontal section (50) of upper rail member (5). FIG. 10, however, shows an inoperative or unlocked state of this lock member (2). Description will now be made of a more detailed construction of the lock member (2) in the slide rail assembly (5, 6). Reference is particularly made to FIGS. 3, 5 10 and 11. The vertical slide section (51) of upper rail member (5) has, defined in the backward end portion thereof, a support area for supportively securing principal parts of the locking mechanism (M) including the rotary lock member (2), the support area forming a cut-away area (51B) and an offset support area (51A) in the illustrated fashion. A support plate (52) is firmly attached to a portion of the upper rail member vertical slide section (51) corresponding to such support area, such as to bridge over the offset support area (51A), as best seen in FIG. 11. The support plate (52) is generally equal in length and heightwise width to the offset support area (51A), and both forward and backward ends of that support plate (52) are fixed via rivets (53) to the vertical slide section (51), so that a support spacing (H) is defined between the two support elements (51A)(52).

The rotary lock member (2) is pivotally mounted in such support spacing (H) with the pin (2P) passing through the bearing hole (2C) thereof as well as through both support area and plate (51A)(52), so that the lock member (2) is free to rotate vertically about the pin (2P) in the support spacing (H). In this respect, as far as the present embodiment is concerned, the pin (2P) is disposed at a proper point in those two support elements (51A)(52) to allow the lock member (2) to be rotated thereabout between the locked position shown in FIG. 3 and the unlocked position shown in FIG. 10. Namely, in the locked position, as in FIG. 3, the lock member (2) is placed in such condition that the first male engagement portion (22) thereof is engaged over the horizontal engagement portion (1A) of female engagement member (1), while the second base edge (2Eb) thereof lies slight above or generally in registry with the lower edge of upper rail member vertical section (51) to thereby be spaced from the bottom wall (6B) of lower rail member (6). On the other hand, in the unlocked position, as in FIG. 10, the lock member (2) is in such a state where the first male engagement portion (22) thereof lies below the horizontal upper section (50) of upper rail member (5) and the first base edge (2Ea) thereof faces closely towards the bottom wall (6B) of lower rail member (6), with the second male engagement portion (22) of lock member (2) being engaged in a lock hole (6h) formed in the lower rail member bottom wall (6B).

Figure 3:
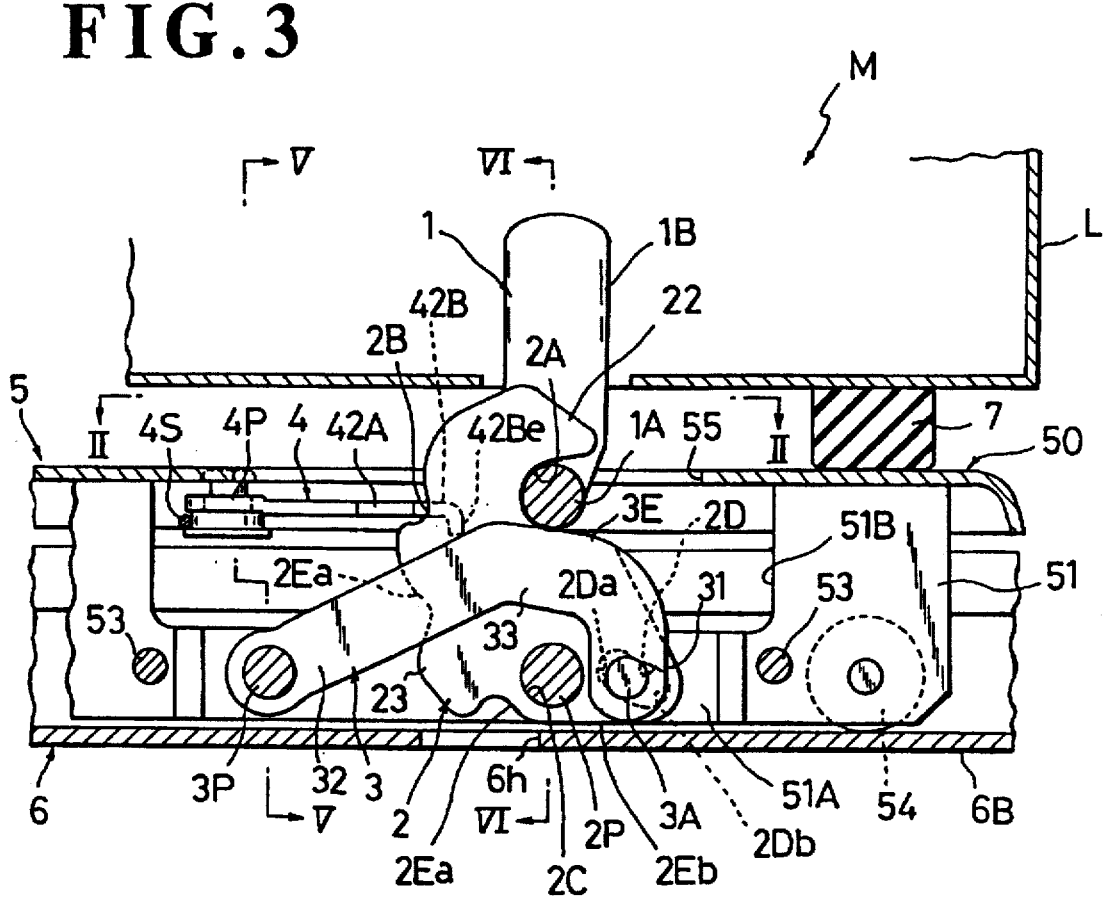
FIG. 3 is a schematic fragmentary sectional view of the slide rail device, showing its principal parts.

It should be noted here that both FIGS. 3 and 10 show a storage position where the jump rear seat is to be rotated and stored behind the front seat (FS); namely, the upper rail member (5) is located at a predetermined backward limit point relative to the lower rail member (6), which can be understood better from FIGS. 2 and 12. Therefore, the lock hole (6h) is defined at a given point in the lower rail member bottom wall (6B) as shown in FIG. 2 where the rear seat (RS) is stopped at the backward limit point for forward jumping rotation about the brackets (70), whereby, upon the second male engagement portion (23) of lock member (2) being engaged in the lock hole (6h), the upper rail member (5) will be locked at such limit point against movement relative to the lower rail member (6). In this respect, the center of rotation, i.e. the pin (2P), of rotary lock member (2) may be positioned adjacent to the lock hole (6h), as shown, in order that both first and second male engagement portions (22)(23) of the same lock member (2) may be displaced along a proper circumferential direction relative to the pin (2P) for engagement with and disengagement from the respective female engagement member (1) and lock hole (6h).

Figure 9:
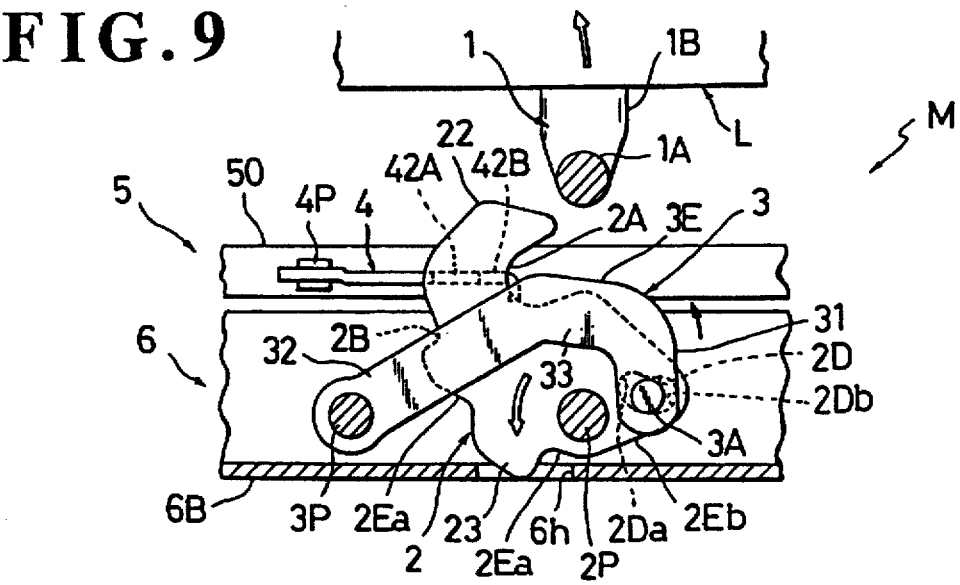
FIG. 9 is a schematic diagram for showing the unlocking action of a locking mechanism provided in the slide rail device.

Also, rotatably mounted in the same support spacing (H) is the actuator arm (3) which is formed from a rigid plate material in a generally inverted U shape, having defined therein a base end portion (32), a horizontal intermediate portion (33) and a connecting end portion (31). As shown, the actuator arm (3) is pivotally connected, at its base end portion (32), to both support area and plate (51A)(52) via a pin (3P), such as to be rotatable vertically about the central axis of pin (3P). The pin (3P) has one end (3Pa) rotatably passing through the support area (51A) and another end (3Pb) rotatably passing through the support plate (52). The base end portion (32) of actuator arm (3) is fixed, as by welding, to the intermediate area of the pin (3P). As shown in FIGS. 10 and 11, a spiral spring (SP) is fixedly wound, at its one end, about such another end (3Pb) of pin (3P), and secured to a lug (52a) of support plate (52) at another end thereof, so that the actuator arm (3) is normally so biased by the spiral spring (SP) to rotate counterclockwise about the pin (3P) to thereby keep its connecting end portion (31) thereof raised upwardly away from the bottom wall (6B) of lower rail member (6). The pin (3P) is disposed in the support spacing (H) in a manner spaced apart from the pin (2P) of rotary lock member (2) at a distance enough to permit a substantive portion of lock member (2) to lie therebetween in such unlocked state as shown in FIG. 10. The connecting end portion (31) of actuator arm (3) is formed with an integral connecting pin (3A) which projects at a right angle therefrom towards the support area (51A) and slidably passes through the guide hole (2D) of rotary lock member (2), so as to provide an interlocked relation between the actuator arm (3) and rotary lock member (2). With particular reference to FIGS. 3, 9 and 10, the arrangement of the actuator arm (3) within the slide rail assembly (5, 6) is such that, when in the unlocked state shown in FIG. 10, the actuator arm (3) is limited against further counterclockwise rotation due to the connecting pin (3A) contacting the second edge (2Db) of guide hole (2D), to the degree at which the upper edge (3E) of actuator arm intermediate area (33) is positioned below the surface of upper horizontal section (50) of upper rail member (5), generally in parallel therewith, while on the contrary, in the locked state shown in FIG. 3, the actuator arm (3) is limited against excessive clockwise rotation due to the connecting pin (3A) contacting the first edge (2Da) of guide hole (2D) so as to prevent the connecting end portion (31) of actuator arm (3) against contact with the bottom wall (6B) of lower rail member (6).

In this connection, it is also noted that the shape and curvature of the arcuate guide hole (2D) may be varied, depending upon the shape of rotary lock member (2), especially depending on the disposition of its first and second male engagement portions (22)(23) relative to the center of rotation at the pin (2P) in order that the rotation of actuator arm (3) will be smoothly transformed via the guide hole (2D) into a proper rotation of the rotary lock member (2) for accomplishing engagement and disengagement of the first and second male engagement portions (22)(23) with and from the respective female engagement member (1) and lock hole (6h). As far as the illustrated embodiment is concerned, the generally square shape of rotary lock member (2) and eccentricity of the bearing hole (2C) defined therein require such arcuate guide hole (2D) having a generally downward curvature as can be seen from FIGS. 3 and 10. But, in such instance where the main body portion (21) of rotary lock member (2) is of a circular shape, with the bearing hole (2C) defined at the center thereof, the guide hole (2D) may be simply formed generally circular at one side of the bearing hole (2c) opposite to the first male engagement portion (22), considering a locus of circumferential displacement of the connecting pin (3A) of actuator arm (3) relative to the pin (3P), with the second male engagement portion (23) defined at a proper angle with the first male engagement portion (22) relative to the bearing hole (2C).

Figure 4:
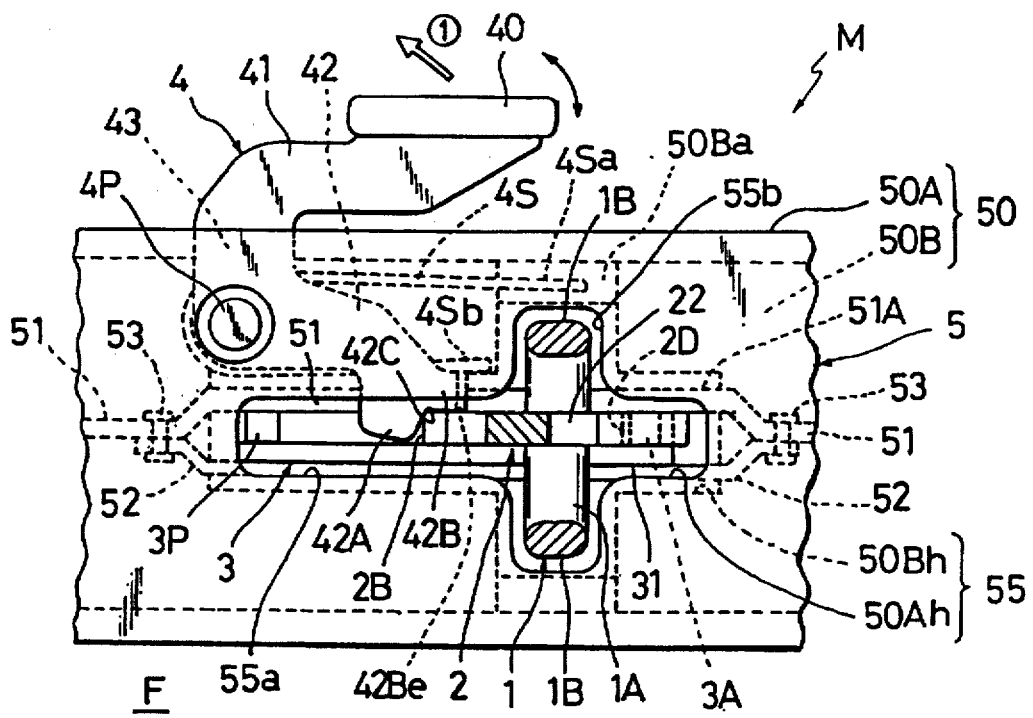
FIG. 4 is a sectional view taken along the line II—II in FIG. 3.
Figure 8:
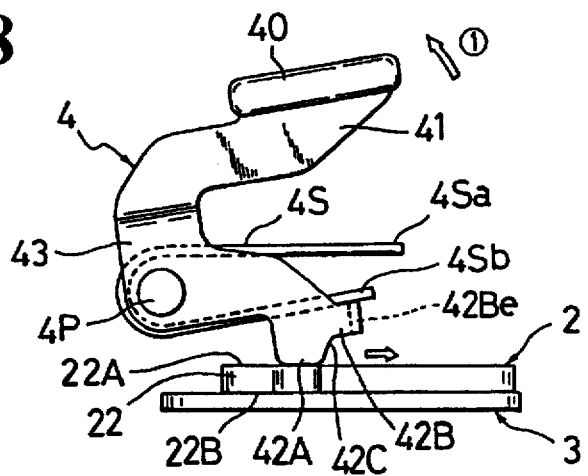
FIG. 8 is a schematic diagram for showing the action of an operation lever to the rotary lock member.

Referring now to FIGS. 4 and 8, the operation lever (4) is shown to be rotatably mounted at the upper rail member (5) in a manner extending horizontally therefrom. Specifically stated, as shown in the plan view of FIG. 4, the operation lever (4) is formed from a plate material in a generally U-shaped configuration having, defined integrally therein, a first lever portion (41), a second lever portion (42) and an intermediate area (43). The first lever portion (41) extends exteriorly and horizontally from the upper horizontal section (50) of upper rail member (5) towards a side outwardly of the slide rail assembly (5, 6) in parallel with the floor (F) as can be seen from FIGS. 5 and 12, and terminates in an end provided with a knob (40). The second lever portion (42) is disposed beneath an outward half portion of the upper horizontal section (50) as can be seen from FIG. 4 and terminates in a bifurcated end having a first end part (42A) and second end part (42B), both of which extends away from each other generally at a right angle, with an engagement corner (2B) defined therebetween. The second end part (42B) of the second lever portion (42) is formed with a downwardly bent end (42Be). As best shown in FIG. 5, the thus-formed operation lever (4) is pivotally mounted at its intermediate area (43) to and beneath the outward half portion of integral upper horizontal section (50B) of upper rail member (5), via a pin (4P), in such a manner as to be rotatable about that pin (4P) between a locking position where the bifurcated end (42A, 42B) thereof is engaged with the notch (2B) of rotary lock member (2) as in FIG. 4 and an unlocking position where the same bifurcated end (42A, 42B) is disengaged from such notch (2B) as can be seen in FIG. 8. Designation (4S) denotes a U-shaped spring by which the operation lever (4) is so biased as to rotate clockwise about the pin (4P) in a direction wherein the bifurcated end (42A, 42B) is engaged with the notch (2B) of rotary lock member (2). As shown in FIG. 4, the spring (4S) is turned about the pin (4P) such that one end (4Sa) thereof is secured in a securing bore (50Ba) of the integral upper horizontal section (50B) of upper rail member (5), while another end (4Sb) thereof is abutted against the downwardly bent end (42Be) of operation lever (4), so as to bias the second lever section (42) of operation lever (4) towards the rotary lock member (2) for locking and unlocking purposes to be explained later.

The opening (55) is formed in a cross fashion in the upper horizontal section (50) of upper rail member (5) at a point where the above-constructed locking mechanism (M) is located. FIG. 4 shows the whole cross-shaped contour of opening (5) which is basically defined by crossing a longitudinal elongated opening area (55a) and a lateral elongated opening area (55b). In the FIG. 4, the longitudinal elongated opening area (55a) is shown to extend along a central longitudinal line of that upper horizontal section (50), having a length and width slightly greater than those of both rotary lock member (2) and actuator arm (3) in the aggregate, so that the first male engagement portion (22) of rotary lock member (2) may be projected upwards and withdrawn downwards through that particular opening area (55a), as can be seen from FIGS. 3, 9 and 10, while the uppermost edge (3E) of actuator arm (3) may reach at a level nearly in registry with the opening area (55a) for quick contact with the male engagement member (1) provided at the jump rear seat (RS) as can be seen from FIGS. 10 and 13. On the other hand, the lateral elongated opening area (55b) is shown to extend in a direction laterally or transversely of the upper horizontal section (50), having a length and width for permitting the male engagement member (1) to be freely passed therethrough for access to or contact with the edge (3E) of actuator arm (3). In the embodiment shown, since the upper horizontal section (50) of upper rail member (5) comprises the main and cover portions (50B)(50A) as mentioned above, such cross-shaped opening generally designated by (5) is actually constituted by an upper cross-shaped opening (50A*h*) formed in the cover member (50A) and a lower cross-shaped opening (50B*h*) formed in the main horizontal section (50B) which directly forms one integral part of the upper rail member (5), such as to attain the aforementioned specific cross-shaped contour and through-opening functions for allowing access of the female engagement member (1) to the actuator arm (3) situated below the upper rail member (5). However, this is just one unlimited mode of upper rail member (5) and thus, hereinafter, unless otherwise specified, such terminologies as "the upper horizontal section (50)" and "cross-shaped opening (55)" shall be simply used as generic expressions defining essential constituent elements of the upper rail member (5).

Designation (7) stands for a rubber buffer element fixed on the leg portion (L) of jump rear seat (RS), which is to be contacted upon the foregoing upper rail member horizontal section (50) when the jump rear seat (RS) is locked to the slide rail device (SL), as shown in FIG. 3.

Now, a description will be made of operations of the above-described slide rail device (SL).

Reference is first made to FIG. 3 which shows the locked state where the jump rear seat (RS) is locked via the locking mechanism (M) to the slide rail assembly (5, 6), which means that the seat (RS) itself may be slidable via the slide rail assembly (5, 6) in the fore-and-aft direction on the floor (F), as shown in FIG. 1, for adjustment in position within the rearward area of automobile. Under this locked state, the rotary lock member (2) is in the shown upstanding state, projecting its first male engagement portion (22) upwardly through the opening (55) to engage over the horizontal part (1A) of female engagement member (1) fixed at the jump rear seat (RS), while the second male engagement portion (23) thereof is located out of engagement in the lock hole (6*h*). Further, as shown in FIG. 4, the engagement corner (42) of second lever portion (42) is urged to engage the notch (2B) of rotary lock member (2) under the biasing force of spring (4S), thereby preventing the first male engagement portion (22) against counterclockwise rotation from the female engagement member (1), so that the lock member (2) is retained in a positive engagement with the female engagement member (1). Now, if it is desired to release the jump rear seat (RS) from such locked state, the operation lever (4) may be rotated about the pin (4P) against the biasing force of spring (4S), as indicated by the arrow ①, to disengage the engagement corner (42C) thereof from the notch (2B) of lock member (2). Then, as shown in FIGS. 8 and 9, the rotary lock member (2) is caused to rotate counterclockwise about the pin (2P) under a biasing force transmitted via the actuator arm (3) from the spiral spring (SP) (See FIG. 10), whereupon the first male engagement portion (22) is simultaneously rotated in the same counterclockwise direction relative to the pin (2P) and thus brought out of engagement with the female engagement member (1). In other words, the unlocking of operation lever (4) from the rotary lock member (2) allows the actuator arm (3) to be forcibly rotated by the spiral spring (SP) counterclockwise or upwardly about the pin (3P) as indicted by the black arrow in FIG. 9, and in response thereto, the rotary lock member (2) connected via the connecting pin (3A) to the actuator arm (3) is caused to rotate about the pin (2P) in the same counterclockwise direction, with the result that the first male engagement portion (22) of rotary lock member (2) is disengaged from the female engagement member (1), while at the same time, the second male engagement portion (23) of rotary lock member is rotatively displaced counterclockwise about the pin (2P) for engagement into the lock hole (6*h*) of lower rail member (6). Also, at this moment, the bifurcated end, especially the first end part (42A) of operation lever (4) slidingly rides on the outward side surface (22A) of first male engagement portion (22) associated with the rotary lock member (2), as understandable from FIGS. 8 and 9, and therefore, the first male engagement portion (22) is slid on the edge of first end part (42A) of operation lever (4) generally along the length-wise direction thereof as can be seen from FIGS. 3, 9 and 10 in sequence. With this arrangement, to quickly draw and release the operation lever knob (40) will allow full rotation of the rotary lock member (2) to complete disengagement of the first male engagement portion (22) from the female engagement member (1). Then, while the rotary lock member (2) is being rotated down to a generally horizontal unlocked position shown in FIG. 10, the connecting pin (3A), by the reason of its associated actuator arm (3) being rotated by the spiral spring (SP) upwardly, is caused to slide along the arcuate guide hole (2D) towards the second edge (2D*b*) of the same guide hole (2D). Referring to FIG. 10, upon the connecting pin (A) reaching and contacting such guide hole second edge (2D*b*), the rotary lock member (2) is biased to the inoperative unlocked position where it lies bodily within the slide rail assembly (5, 6), with the second engagement portion (22) thereof engaged in the lock hole (6*h*), whereas on the other hand, the actuator arm (3) is limited in its upward rotation and retained in a level where its intermediate portion (33) lies below the upper horizontal section (50) of upper rail member (5) and the associated upper edge (3E) is set nearly in registry with or below the opening (55), crossing the lateral opening area (55*b*). Of course, at this unlocked stage, the female engagement member (1) is disengaged from the first male engagement portion (22) of rotary lock member (2), and the jump seat (RS) may be rotated forwardly about the hinge brackets (70) to such inverted upstanding state as shown in FIGS. 2 and 12. Further, by virtue of the second male engagement portion (23) being engaged in the lock hole (6*h*), the upper rail member (5) is locked against movement at a given forward limit point with respect to the lower rail member (6) as can be seen from FIG. 2, so as to insure stable rotation of the jump rear seat (RS) about the hinge bracket (70) to a predetermined storage area immediately behind the front seat (FS).

Figure 13:
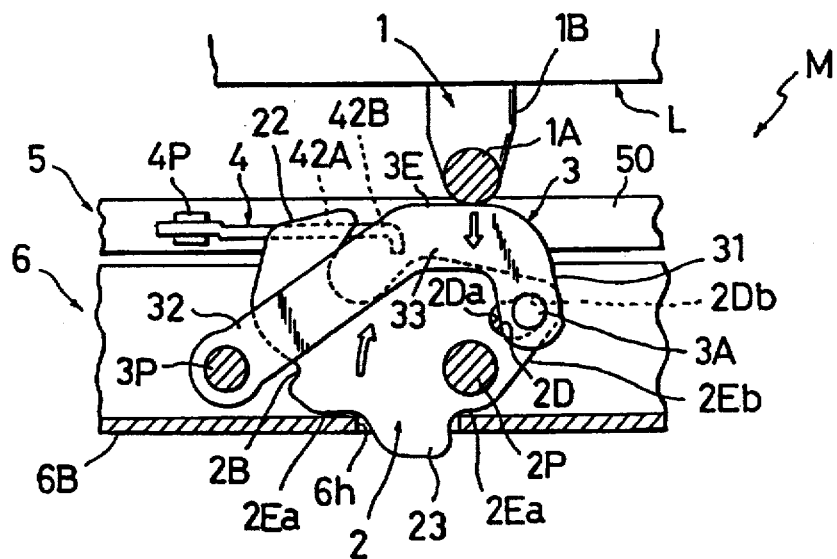
FIG. 13 is a schematic diagram for showing how the jump seat is locked to the lower rail member by the locking mechanism.

Conversely, if it is desired to turn back the jump rear seat (RS) from the foregoing inverted non-use position (See FIG. 12) to the locked use position shown in FIG. 1, the jump rear seat (RS) may be jumped up and rotated back about the hinge bracket (70) towards the upper rail member (5) so as to insert the female lock member (1) through the lateral opening area (55*b*) of cross-shaped opening (55) for contact with the upper edge (3E) of actuator arm (3) disposed within the slide rail assembly (5, 6). In this instance, as shown in FIG. 13, the actuator arm (3) is pushed downwards by the horizontal engagement portion (1A) of female engagement member (1), with the result that the actuator arm (3) is caused to rotate about the pin (3A) clockwise against the biasing force of spiral spring (SP), displacing the connecting pin (3A) from the second edge (2D*b*) of guide hole (20) to the first edge (2D*a*) thereof, which in turn causes simultaneous clockwise rotation of the rotary lock member (2)

about the pin (2P) towards the female engagement member (1). Then, as shown in FIG. 3, the first male engagement portion (22) of rotary lock member (2) is engaged over the horizontal engagement portion (1A) of female engagement member (1), while being also engaged, at the notch (2B) thereof, with the engagement corner (42C) of operation lever (4), whereupon there is established a firm locked state between the rotary lock member (2) and female engagement member (1) to complete locking of the jump rear seat (RS) to the upper rail member (5). Of course, the second male engagement portion (23) of rotary lock member (2) is disengaged from the lock hole (6h), which permits free fore-and-aft sliding movement of the seat (RS) along the elongated lower rail member (6). It is observed here that the actuator arm (3) is so urged by the spiral spring (SP) to strongly abut its upper edge (3E) against the female engagement member horizontal engagement portion (1A), thereby making positive and firm the engagement between the first male engagement portion (22) and that horizontal engagement portion (1A).

As constructed above, it is to be appreciated that the slide rail device (SL) in accordance with the present invention is endowed with the following advantages:

(I) The movable elements of locking mechanism (M), such as the rotary lock member (2) and actuator arm (3), are so mounted at the vertical slide section (51) as to be accommodated within the upper and lower rail members (5)(6), except that the first male engagement portion (22) of rotary lock member (2) will project upwards from the upper rail member (5) in such locking case as in FIG. 3. The operation lever (4) projects a short distance from and on the same horizontal plane with the upper horizontal section (50) of upper rail member (5), so as not to project thereabove. Accordingly, in the unlocked state as in FIG. 2, 10 and 12, there is no objectionable upward projection upon the upper rail member (5) which may keenly contact and damage a baggage or article loaded thereon. Further, the flat upper horizontal section (50) of upper rail member (5) provides a less projection on the flat surface of floor (F), contributing to an aesthetic improvement of whole outer appearance of rearward floor area widened by the rotation of jump rear seat (RS) to the storage area behind the front seat (FS). Those advantages may be enhanced by attaching the smooth faced cover member (50A) over the upper surfaces of the main integral horizontal portion (50B) associated with the upper rail member (5).

(II) Both rotary lock member (2) and actuator arm (3) extend toward each other from their respective spaced-apart pins (2P)(3P) and are rotatable within a smallest possible range defined in the support area (51A, 52) of upper rail member (5), and also the operation lever (4) is disposed generally within such small area. In addition, both plate thin bodies of those elements (2)(3) are nearly juxtaposed together, extending vertically in the height-wise direction of lower rail member (6). Thus, the locking mechanism (M) per se may be made so small and compact in sizes as to be easily installed within the slide rail assembly (5, 6).

(III) All the rotary lock member (2), actuator arm (3) and operation lever (4) are movably connected together in such substantially integral manner that the rotary lock member (2) and actuator arm (3) are interconnected directly via the connecting pin (3) and guide hole (2D), while the operation lever (4) and rotary lock member (2) are biasingly engaged with each other by the spring (4S). Thus, all those elements do not work independently, but are in a close interlocking relationship with one another so that they may be moved together without wobbling to provide an immediate transmission of forces and motions among them, to eliminate their malfunctions and maintain a failure-free locking/unlocking operation of the locking mechanism (M).

While having described the present invention thus far, it should be understood that the invention is not limited to the illustrated embodiment, but any other modifications, replacements and additions may be structurally applied thereto without departing from the scopes of appended claims. For example, the jump seat is not limited to the illustrated rear seat (RS), but may be one single seat, a second rear seat or third rear seat.

What is claimed is:

1. A slide rail device for a jump seat, in which the jump seat may be jumped up and rotated from the slide rail device to an inverted upstanding state at a storage area in an automobile, said slide rail device comprising:

a lower rail means fixed in a floor of an automobile;

an upper rail means slidably fitted in said lower rail means, on which upper rail member, a seat cushion of said jump seat is pivotally mounted at one end portion thereof, wherein said jump seat may be adjusted in position, via said upper and lower rail means, in a fore-and-aft direction of said automobile; and a locking mechanism for locking and unlocking said jump seat to and from said upper rail means, said locking mechanism including:

a female engagement means provided at another end portion of said seat cushion of said jump seat;

a lock means having a male engagement portion, said lock means being so rotatable within said lower rail means as to project and withdraw said male engagement portion from and into said lower rail means;

an actuator means which is so operatively connected with said lock means within said lower rail means that the actuator means normally retains said lock means at an unlocked position where said male engagement portion of said lock means is withdrawn in said lower rail means and disengaged from said female engagement means, and further, the actuator means, when pushed by said female engagement means, causes said lock means to rotate towards a locked position where said male engagement portion of said lock means projects from said upper rail means and engages said female engagement means; and a lever means movably provided at said upper rail means, said lever means being operatively engaged with said lock means, wherein operation of said lever means permits said lock means to be rotated towards one of said unlocked and locked positions.

2. The slide rail device according to claim 1, wherein said lower rail means is fixedly embedded in said floor such that an upper side of said lower rail means is only exposed from the floor, wherein said upper rail means has an upper horizontal section and a vertical slide section integrally extending downwards from said upper horizontal section, said vertical slide section being slidably fitted in and along said lower rail means, and wherein said lock means and actuator means of said locking mechanism are disposed at said vertical slide section of said upper rail means, while said lever means is disposed at said upper horizontal section of said upper rail means.

3. The slide rail device according to claim 2, wherein a cover member is affixed on an upper surface of said upper horizontal section of said upper rail means.

4. The slide rail device according to claim 3, wherein said cover member is formed from a synthetic resin material.

5. The slide rail device according to claim 1, wherein said upper rail means is formed with an opening means for allowing access of said female engagement means to said actuator means within said lower rail means so that said female engagement means may contact and push said actuator means to cause rotation of said lock means towards said locked position.

6. The slide rail device according to claim 1, wherein said female engagement means comprises a generally U-shaped engagement member and said male engagement portion of said lock means is of a hook-like shape for engagement over a horizontal portion of said generally U-shaped engagement member.

7. The slide rail device according to claim 1, wherein said locking means comprises a rotary lock member pivotally mounted at said upper rail means within said lower rail means, wherein said male engagement portion of said lock means is formed in one side of said rotary lock member, having a hook-like shape for engagement with said female engagement means, and wherein said rotary lock member is formed at another side thereof with a connecting area to which said actuator means is operatively connected.

8. The slide rail device according to claim 1, wherein said actuator means comprises an actuator arm and a biasing spring, wherein said actuator arm is rotatably mounted at said upper rail means and so disposed within said lower rail means as to be not only operatively connected with said lock means, but also be accessible by said female engagement means, whereby the actuator arm, when pushed by said female engagement means, causes said lock means to rotate towards said locked position, and wherein said biasing spring biasingly causes said actuator arm to rotate towards a direction in which the actuator arm retains said lock means at said unlocked position.

9. The slide rail device according to claim 8, wherein said actuator arm has an edge portion which is to be accessed and pushed by said female engagement mean, and wherein said actuator arm is normally urged by said biasing spring so that said edge portion thereof is retained at a level generally in registry with a upper surface of said upper rail means when said lock means is retained at said unlocked position.

10. The slide rail device according to claim 7, wherein said rotary lock member has a center of rotation defined between said male engagement portion and connecting area thereof, wherein said actuator means comprises a generally inverted-U-shaped actuator arm rotatably mounted at said upper rail means, said generally inverted-U-shaped actuator arm having a connecting end portion extending in a direction opposite to a direction in which said male engagement portion extends from said lock means, said connecting end portion being rotatably connected to said connecting area of said rotary lock member, and wherein said generally inverted-U-shaped actuator arm further has an upper edge on which said female engagement means is to be contacted so that said connecting area of the arm member may be displaced to cause simultaneous rotation of said rotary lock member about the center of rotation to thereby bring said male engagement portion to engagement with said female engagement means.

11. The slide rail device according to claim 1, wherein said lower rail means is formed with a lock hole and said lock means further has a second male engagement portion for engagement in said lock hole, with such an arrangement that, when said second male engagement portion of said lock means is engaged in said lock hole, said upper rail means is locked relative to said lower rail means at a limit point adjacent to said storage area.

12. The slide rail device according to claim 1, wherein said lock means includes an engagement area defined in a side thereof opposite to said male engagement portion, and wherein said lever means is rotatably mounted at said upper rail means, comprising a first portion and a second portion which respectively extend outwardly and inwardly of said upper rail means, and wherein said first portion is provided with a knob, while said second portion is releasably engaged with said engagement area of said lock means.

13. The slide rail device according to claim 12, wherein a biasing means is provided so as to biasingly rotate said lever means towards a direction in which said second portion of the lever means is engaged with said engagement area of said lock means.

14. The slide rail device according to claim 12, wherein said first portion of said lever means extends outwardly and horizontally from said upper rail means on a same plane therewith.

15. A slide rail device for a jump seat, in which the jump seat may be jumped up and rotated from the slide rail device to an inverted upstanding state at a storage area in an automobile, said slide rail device comprising:

a lower rail means fixed in a floor of an automobile;

an upper rail means slidably fitted in said lower rail means, said upper rail means having a hinge bracket provided thereon at one end thereof, wherein a seat cushion of said jump seat is rotatably mounted via said hinge bracket upon said upper rail means;

said lower and upper rail means permitting said jump seat to be adjusted in position in a fore-and-aft direction of said automobile;

said upper rail means having an upper horizontal section and a vertical slide section integrally extending downwardly from said upper horizontal section, wherein said vertical slide section is slidably fitted in and along said lower rail means and has a support area defined at one end portion thereof opposite to said hinge bracket;

a locking mechanism for locking and unlocking said jump seat to and from said upper rail means, said locking including:

a female engagement means which is provided at another end portion of said seat cushion of said jump seat such that, when the jump seat is rotated about said hinge bracket from said storage area to said lower rail means, said female engagement means is brought to a point corresponding to said support area associated with said upper rail means;

a lock means having a male engagement portion;

an actuator means operatively connected with said lock means;

both said lock means and actuator means being rotatably mounted at said support area defined in said vertical slide section of said upper rail means, such that said actuator means normally retains said lock means at an unlocked position where said male engagement portion of said lock means is withdrawn in said lower rail means and disengaged from said female engagement means, and further, said actuator means, when pushed by said female engagement means, causes said lock means to rotate towards a locked position where said male engagement portion of said lock means projects from said upper rail means and engages said female engagement means; and a lever means movably provided at said horizontal section of said upper rail means, said lever means being operatively engaged with said lock means, wherein operation of said lever means permits said lock means to be rotated towards one of said unlocked and locked positions.

16. The slide rail device according to claim 15, wherein said actuator means comprises an actuator arm and a biasing spring, wherein said actuator arm and said lock means are arranged in such a manner as to be juxtaposed together at said support area, wherein said actuator arm is rotatably mounted at said upper rail means and so disposed within said lower rail means as to be not only operatively connected with said lock means, but also be accessible by said female engagement means, whereby said actuator arm, when pushed by said female engagement means, causes said lock means to rotate towards said locked position, and wherein said biasing spring biasingly causes said actuator arm to rotate towards a direction in which the actuator arm retains said lock means at said unlocked position.

17. The slide rail device according to claim 15, wherein said upper horizontal section of said upper rail means is formed with an opening means for allowing access of said female engagement means to said actuator means within said lower rail means so that said female engagement means may contact and push said actuator means to cause rotation of said lock means towards said locked position.

* * * * *